US005535787A

United States Patent [19]
Howell

[11] Patent Number: 5,535,787
[45] Date of Patent: Jul. 16, 1996

[54] FLEXIBLE CABLE HOLDER

[76] Inventor: Kenneth L. Howell, 1270 Oakhaven Dr., Roswell, Ga. 30075

[21] Appl. No.: 349,666

[22] Filed: Dec. 2, 1994

[51] Int. Cl.⁶ .................................................. F16L 9/00
[52] U.S. Cl. .................... 138/167; 138/128; 138/118.1; 138/110; 138/120; 428/100; 248/205.2; 248/68.1
[58] Field of Search .................................. 138/167, 120, 138/128, 155, 106, 108, 110, 118.1; 137/375; 174/95; 24/17 AP, 16 PB, 306, 442; 248/205.2, 68.1; 428/100

[56] References Cited

U.S. PATENT DOCUMENTS

| | | | |
|---|---|---|---|
| 1,794,102 | 2/1931 | Comins . | |
| 1,933,279 | 10/1933 | Quarnstrom | 138/156 |
| 3,161,210 | 12/1964 | Loof | 138/128 |
| 3,941,159 | 3/1976 | Toll | 138/147 |
| 4,280,258 | 7/1981 | Kunze | 24/257 |
| 4,374,596 | 2/1983 | Schlemmer et al. | 285/419 X |
| 4,391,303 | 7/1983 | Holgersson | 138/156 X |
| 4,532,168 | 7/1985 | Steele et al. | 428/99 |
| 4,576,846 | 3/1986 | Noel | 138/156 X |
| 4,640,032 | 2/1987 | Lewis | 40/316 |
| 4,669,509 | 6/1987 | Botsolas | 138/167 X |
| 4,706,914 | 11/1987 | Ground | 24/306 X |
| 4,759,963 | 7/1988 | Uso, Jr. et al. | 24/442 X |
| 4,762,750 | 8/1988 | Girgis et al. | 428/378 |
| 4,862,563 | 9/1989 | Flynn | 24/306 X |
| 4,893,381 | 1/1990 | Frankel | 24/442 X |
| 4,920,235 | 4/1990 | Yamaguchi | 24/442 X |
| 5,024,251 | 6/1991 | Chapman | 138/167 X |
| 5,104,076 | 4/1992 | Goodall, Jr. | 24/306 X |
| 5,235,136 | 8/1993 | Santucci et al. | 174/68.3 |
| 5,317,787 | 6/1994 | Fortsch | 24/17 AP X |

*Primary Examiner*—Patrick Brinson
*Attorney, Agent, or Firm*—Kenneth S. Watkins, Jr.

[57] ABSTRACT

A flexible cable holder is disclosed comprising a flexible web with a plurality of edge fasteners along opposite edges of the web. The edge fasteners are engaged, forming an enclosed duct for retaining cables, wires and power cords. End fasteners are provided at the ends of the web for attaching adjacent cable holders end-to-end. The web is flexible allowing the cable holder to form bends without special fittings or devices. End fasteners may be connected to edge fasteners to form branch connections.

3 Claims, 4 Drawing Sheets

FLEXIBLE CABLE HOLDER

BACKGROUND OF THE INVENTION

As technology of digital processing and communication continues to improve, more and more of these devices are used in homes and offices. New accessories and peripheral devices are available and finding use in ever increasing numbers. These devices include computers, printers, monitors, modems, switches, remote storage devices, FAX machines, speakers and other devices. The increased use of these devices frequently results in problems containing, routing, protecting and concealing cables, power cords and wiring between the devices. This is especially a problem as more of these devices are networked between workstations and other servers. Frequently, the connection of these devices leads to an unsightly arrangement, at best, and a potential safety problem, in other cases.

Cable raceways or ducts have been used for some time to route cables and power cords. Examples of these devices include U.S. Pat. No. 1,794,102 for a conduit for electric wires and U.S. Pat. No. 5,235,136 for a one piece recloseable cable and wire duct. These and other devices suffer the drawbacks of requiring special fittings or devices at corners, turns or branch connections. They are also time consuming to install in corners and at branch connections and are difficult to conceal when mounted along floors, walls or along the edge of furniture.

SUMMARY OF THE INVENTION

The present invention provides a device which addresses the disadvantages of earlier cable retaining devices. An object of the present invention is to provide a cable holder which retains one or more cables, power cords, wires or optical fiber devices along floors, walls or furniture.

Another object of the present invention is to provide a cable holder which can easily be connected end-to-end without separate fittings.

Another object of the present invention is to provide a cable holder which does not require special fittings or parts for turns or branch connections.

Another object of the present invention is to provide a cable holder which can be quickly and easily installed without special tools or installation experience.

Another object of the present invention is to provide a cable holder of a material which can be concealed.

Another object of the present invention is to provide a cable holder which is very inexpensive to purchase and install.

Yet another object of the present invention is to provide a cable holder for easy addition, removal or re-routing of a cable.

Still another object of the present invention is to provide a cable holder which can be removed and reused in another installation.

The present invention is a cable holder which comprises a flexible web having releasable fasteners along the edges of the web. The web is wrapped around the cable or cables and the edge fasteners are engaged, enclosing the cables. The web comprises an end fastener located on one end between the edge fasteners to fasten adjacent cable holders end-to-end. The flexible web allows the holder to flex around or inside corners and make bends as required. The end fastener is fastened to an edge fastener to form branch connections.

The web of the preferred embodiment of the present invention is of a woven fabric to provide required flexibility and strength. The material can be made to match floor and wall coverings to conceal the holder. The fabric can be impregnated with moisture-resistant and fire-resistant materials.

Another embodiment of the present invention utilizes hook and loop fasteners for the edge and/or end fasteners. The edge fasteners may be continuous strips of fastener material or, in an alternative embodiment, the edge fasteners may be a plurality of fasteners spaced along the edge of the holder. Reinforcing ribs, transverse to the longitudinal axis can be attached to the web to provide a desired cross sectional shape to the holder without significantly reducing the bending flexibility of the cable holder.

BRIEF DESCRIPTION OF THE DRAWINGS

These and other features, aspects and advantages of the present invention will become better understood with regard to the following description, appended claims and accompanying drawings where:

DETAILED DESCRIPTION

The following is a detailed description of a flexible cable holder which conceals a collection of cables.

Figure 1:
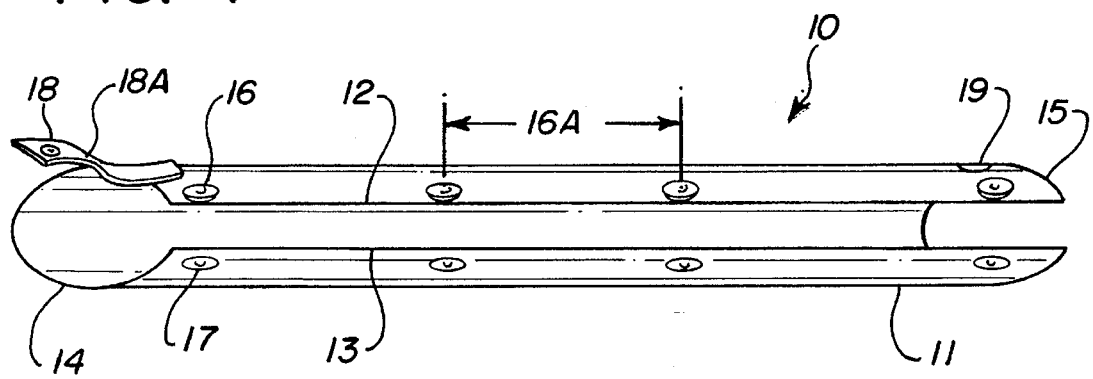
FIG. 1 is a perspective drawing of the preferred embodiment of the present invention.

FIG. 1 is a perspective drawing of the flexible cable holder 10. Web 11 is a flexible sheet having edge 12, opposite edge 13, end 14 and opposite end 15. In the preferred embodiment, web 11 is a woven nylon fabric impregnated with urethane for improved surface texture and moisture resistance. Web 11 may be made of a material to match floor or wall coverings. In an alternative embodiment, web 10 is impregnated with fire-retardant substances to improve fire safety. The web material, weave and impregnated material are chosen to allow sufficient flexibility for bending when the web is formed into a cable holder as described in the following sections.

Releasable fasteners such as male snap fasteners 16 are disposed along edge 12. Matching releasable fasteners such as female snap fasteners 17 are disposed along opposite edge 13. (Within the context of the attached specification and claims, the term matching fastener is one which engages the fastener.) Fasteners 16 and matching fasteners 17 are spaced along the edges to provide adequate holder closure strength and edge coverage, normally 1"–12" between adjacent fasteners. In the preferred embodiment, the fastener spacing 16A is 6".

Figure 3:
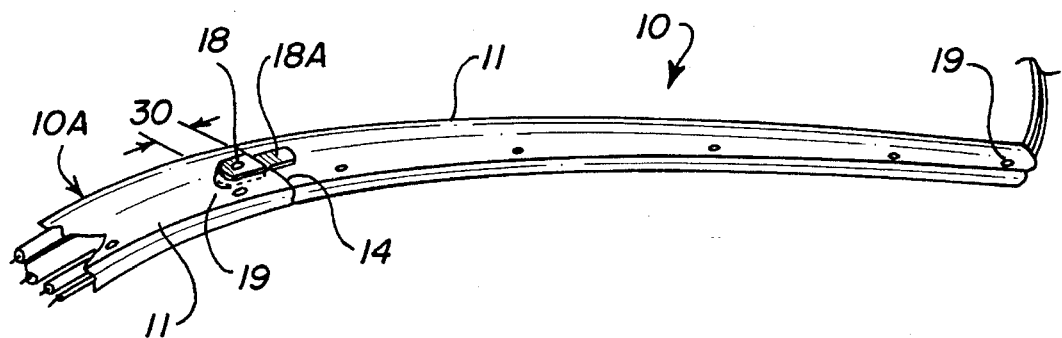
FIG. 3 is a perspective drawing of two cable holders connected end to end.

A second set of releasable fasteners are used to connect end 14 and opposite end 15 to adjacent holders. Male end snap fastener 18 is attached to end flap 18A. End flap 18A is attached to end 14 of web 11 between edge fasteners 16 and matching edge fasteners 17. End flap 18A allows fastener 18 to extend outward beyond end 14 to fasten adjacent webs as shown in FIG. 3. Female end snap fastener 19 is attached to end 15 between edge fasteners 16 and matching edge fasteners 17. Fasteners and matching fasteners are attached to web 11 or end flap 18A by crimping, sewing, bonding or other suitable means.

Figure 2:
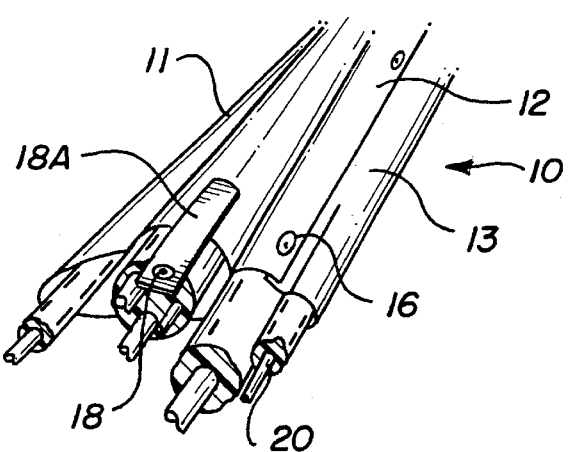
FIG. 2 is a perspective end view of the embodiment of FIG. 1.

FIG. 2 is an end perspective view of cable holder 10. Web 11 is wrapped around cables 20 to form the holder. Edge fasteners 16 and matching edge fasteners 17 (not shown) fasten edge 12 and opposite edge 13 to secure holder 10. End fastener 18 of end flap 18A attaches holder 10 to an adjacent holder.

FIG. 3 shows holder 10 attached to an adjacent holder 10A. End fastener 18 of end flap 18A fastens holder 10 to matching end fastener 19 of holder 10A. End fastener 18 extends beyond end 14 of holder 10 by a sufficient distance 30 to enable end fastener 18 to engage matching end fastener 19 of adjacent holder 10A without crimping or folding web 11. End fastener 18 is attached to holder 10 in the required position by end flap 18A. Additional end flaps 18A and end fasteners 18 and 19 may be added for additional security to the connection between holders.

Figure 4:
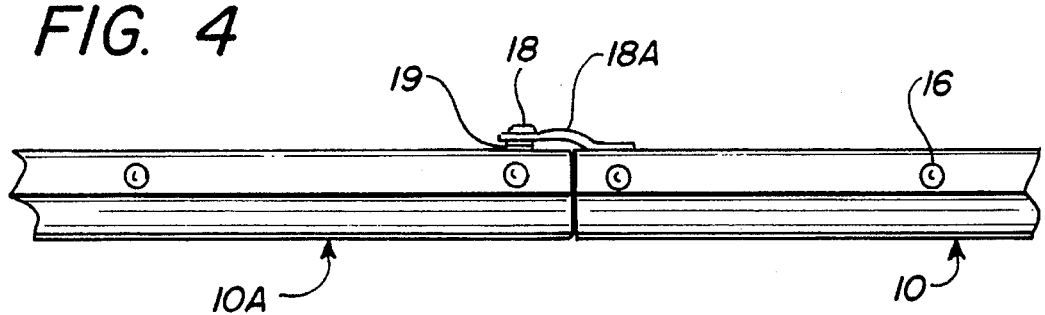
FIG. 4 is a side elevation drawing of two cable holders connected end to end.

FIG. 4 is a side elevation view of end fastener 18 of holder 10 engaging matching end fastener 19 of adjacent holder 10A.

Figure 5:
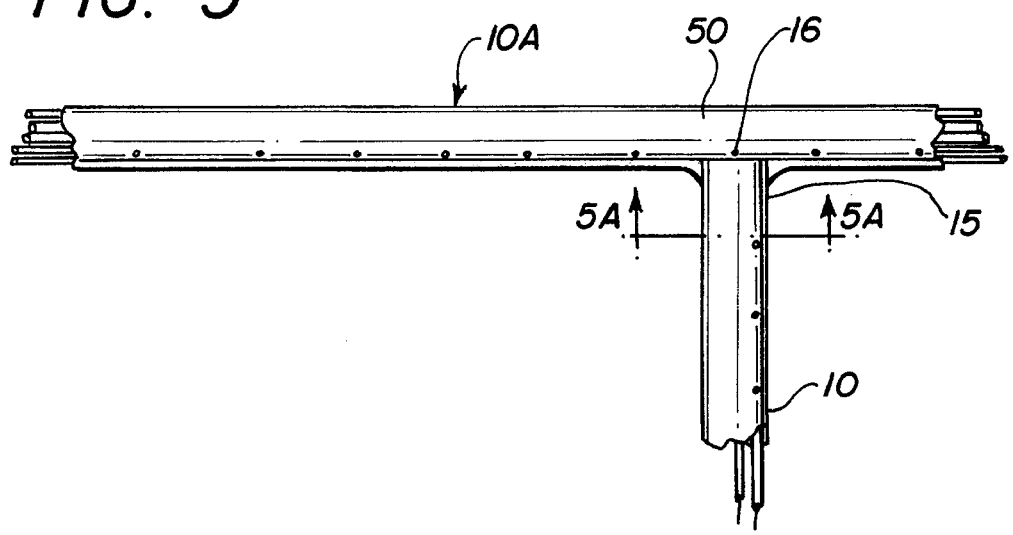
FIG. 5 is a plan view of a branch connection between two cable holders.

FIG. 5 is a plan view of holder 10 making branch connection 50 with holder 10A. Edge fastener 16 of holder 10A engages matching end fastener 19 (Shown in FIG. 5A) of holder 10 to secure the holders together. Branch connection 50 may be a "T" or "Y" connection as required.

Figure 5A:
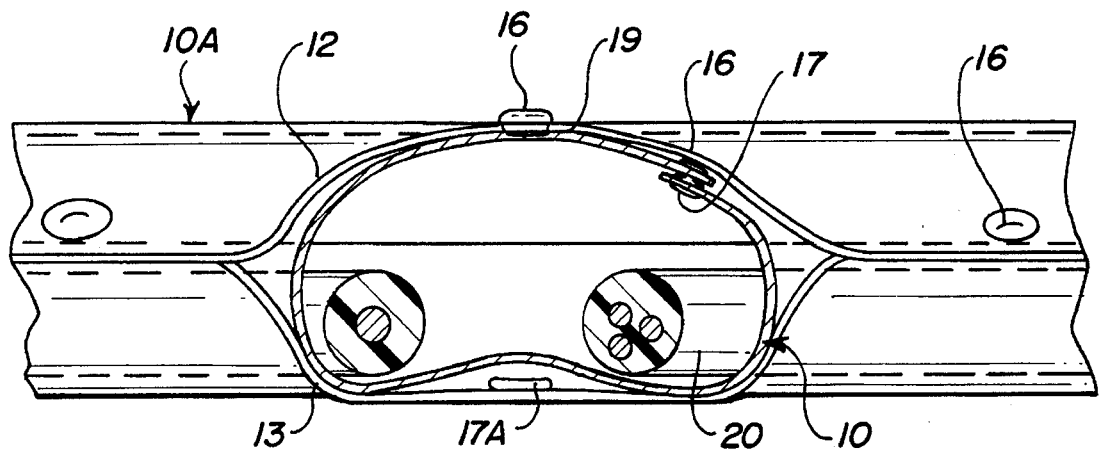
FIG. 5A is a detailed cross section of FIG. 5.

FIG. 5A is a cross section detail of FIG. 5 showing edge fastener 16 of holder 10A engaging matching end fastener 19 of holder 10. Edge 12 and opposite edge 13 are separated as shown in FIG. 5A to insert end 15 of holder 10 in holder 10A to form the branch connection. Matching edge fastener 17A of separated edge 13 is not used when the branch connection is made. Cable 20 may be routed from holder 10A to holder 10 as shown in the figure.

Figure 6:
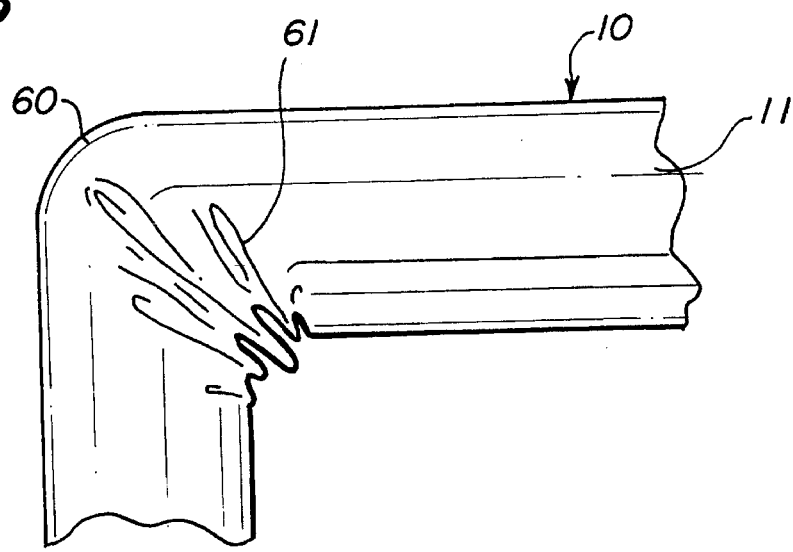
FIG. 6 is a plan view of a ninety degree corner bend of the cable holder.

FIG. 6 is a plan view of cable holder 10 making a 90 degree corner 60. The inside of corner 60 will form ridges 61 due to the flexibility of web 11. Use of flexible web 11 in holder 10 allows turns without the need for special fittings.

Figure 7A:
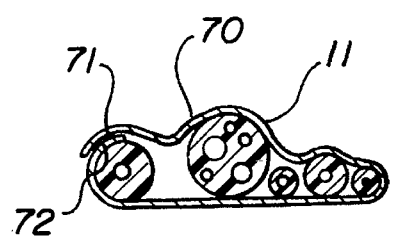
FIG. 7A is a cross section of the embodiment of FIG. 7.
Figure 7:
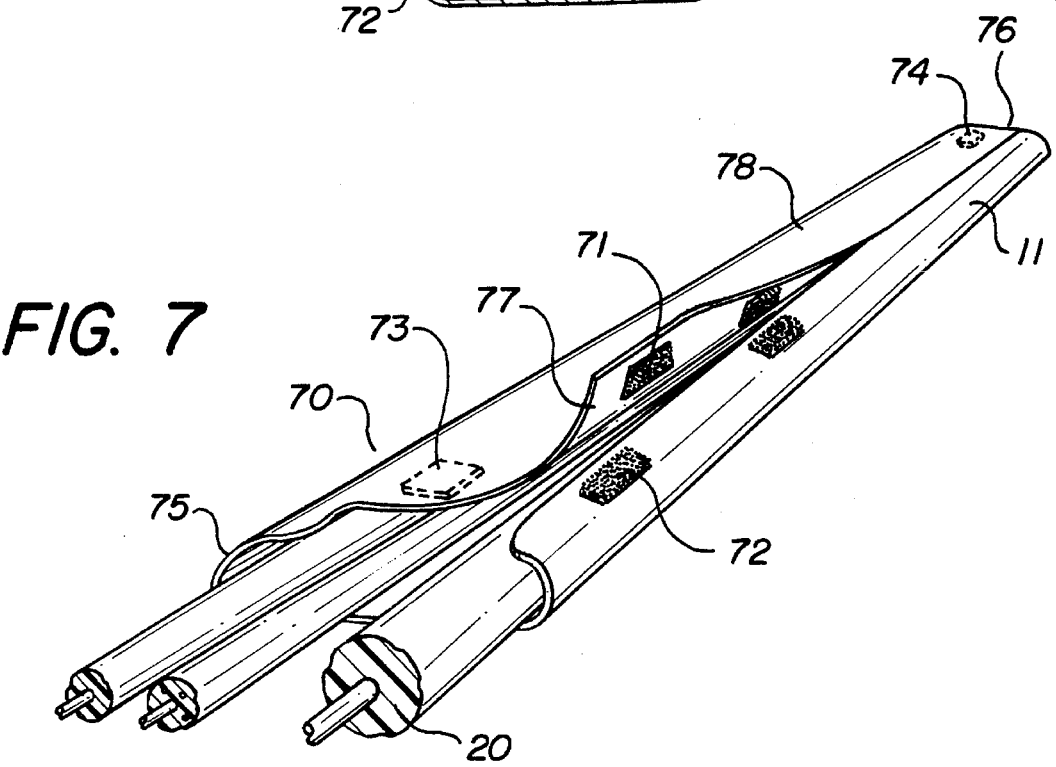
FIG. 7 is a perspective drawing of a cable holder utilizing hook and loop fasteners.

FIG. 7 is a perspective drawing of alternative embodiment 70 utilizing hook and loop fasteners. Edge fastener 71 engages matching edge fastener 72 to form holder 70. End fastener 73 located on the inside surface 77 of end 75 engages matching end fastener 74 on the outside surface 78 of opposite end 76 of an adjacent holder (not shown) to join adjacent holders. The ends of adjacent holders are overlapped (not shown) as necessary to engage the end fasteners. Fasteners are attached to web 11 by adhesive bonding or sewing.

FIG. 7A is a cross section of holder 70 showing edge fastener 71 engaging matching edge fastener 72 to enclose holder 70.

Figure 8:
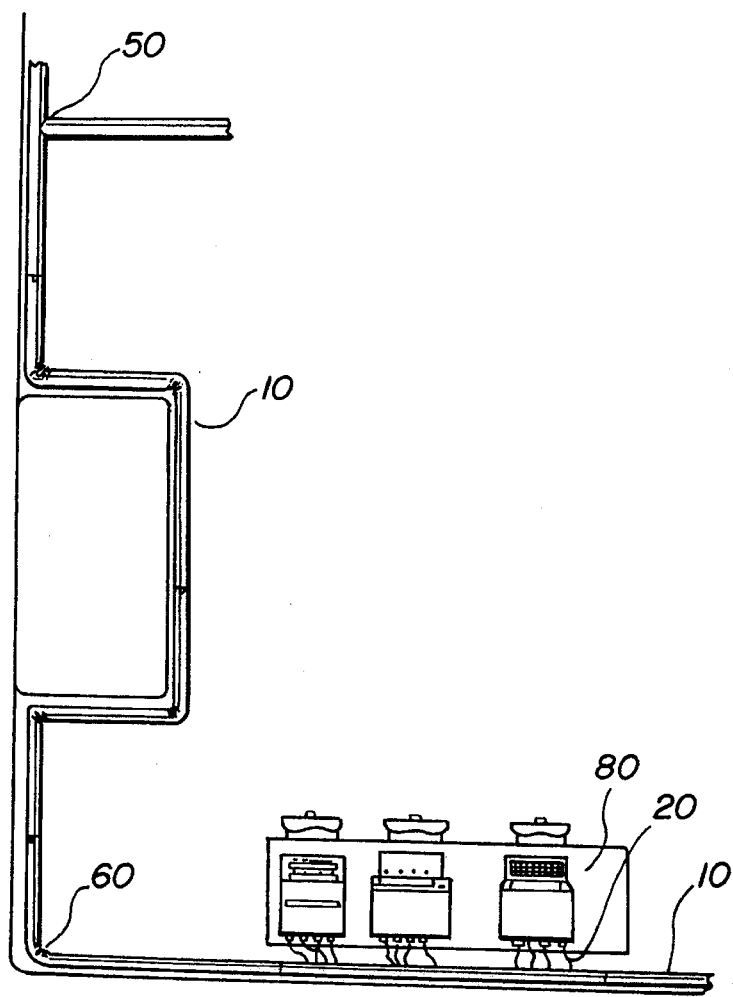
FIG. 8 is a plan view of a cable holder application.

FIG. 8 is a plan view of multiple sections of holder 10 installed in a computer workstation environment. Individual cables 20 may be routed from holders 10 to components 80, or they may be branched at branch connections 50. Cable holders are flexible enough to make corners 60 without special fittings.

Figure 9:
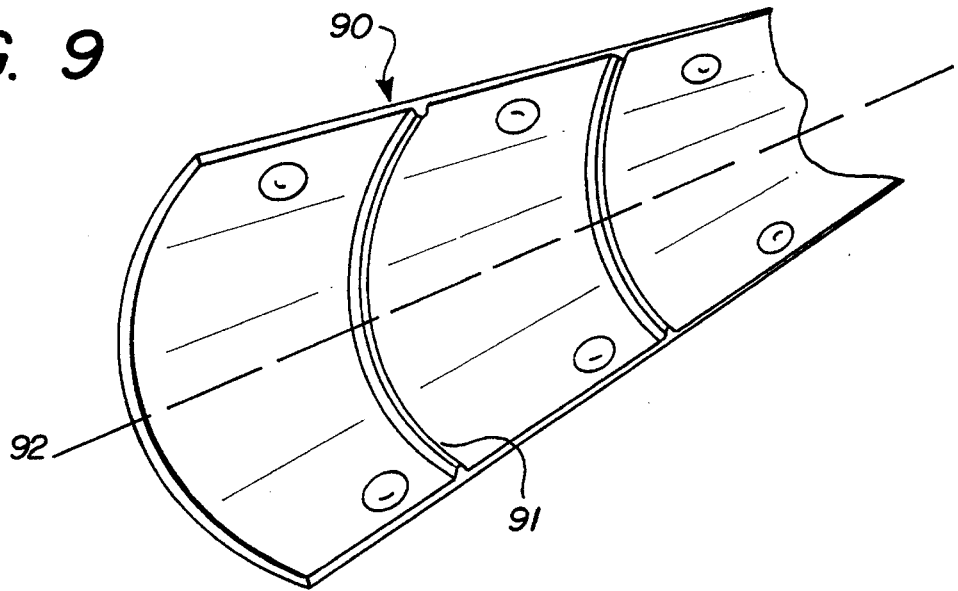
FIG. 9 is a perspective drawing of a cable holder with transverse reinforcing ribs.

FIG. 9 shows alternative embodiment 90 utilizing reinforcing ribs 91 to add rigidity to the holder without significantly reducing the ability to form corners and bends in the holder. Rib 91 is disposed transversely to longitudinal axis 92 of holder 90. Ribs 91 may be of rubber, plastic or other suitable material. They may be bonded, sewn or molded integrally with an impregnated material of web 11.

In the preferred embodiment, the standard holder length is 6' and the standard web width is 10"–12". Other lengths and widths can be used as desired or convenient. A section may be cut to allow termination at the desired point. If greater cable volume is required, sections may be joined edge to opposite edge. The inherent design of the cable holder allows great flexibility in applications without special fittings, adaptors or add ons.

Accordingly the reader will see the Flexible Cable Holder provides a practical conduit for routing cords and cables. The cable holder comprises the following additional advantages:

it is flexible enough to make turns and bends without special fittings;

it can be made to match the floor or wall coverings;

sections may be joined edge to opposite edge to increase capacity;

end fasteners may be connected to edge fasteners to form branch connections;

It can be installed quickly and easily by a user with no special tools or experience; and it is simple and can be manufactured at low cost.

Although the description above contains many specifications, these should not be construed as limiting the scope of the invention but as merely providing illustrations of some of the presently preferred embodiments of this invention. For example, button and button hole fasteners can be used to fasten edges and ends, and reinforcing strips may be added to prevent fraying when a section is cut, etc.

Thus the scope of the invention should be determined by the appended claims and their legal equivalents, rather than by the examples given.

I claim:

1. A flexible cable holder for retaining cables comprising:
   (a) a flexible web having an edge, an opposite edge, an end, an opposite end, an inside surface and an outside surface;
   (b) a releasable edge fastener disposed on the inside surface of the web along the edge;
   (c) a matching releasable edge fastener disposed on the outside surface of the web along the opposite edge;
   (d) a releasable end fastener disposed near the end of the web on the inside surface between the edge fastener and the matching edge fastener, the releasable end fastener spaced from the end of the web by a first separation distance; and
   (e) a matching releasable end fastener disposed near the opposite end of the web on the outside surface between the edge fastener and the matching edge fastener, the matching releasable end fastener spaced from the opposite end of the web by a second separation distance;

wherein the web is constructed of a material of flexibility sufficient to allow bending of the web around a corner when the web is wrapped around a cable and the edge fastener engaged to the matching edge fastener to enclose the cable in the web, and wherein the releasable end fastener and the matching releasable end fastener provide a means for attaching a plurality of said cable holders end to end with an end of a first said cable holder overlapping an opposite end of a second said cable holder.

2. The holder of claim 1 wherein the edge fastener and the end fastener are hook and loop fasteners and the matching edge fastener and matching end fasteners are matching hook and loop fasteners.

3. The holder of claim 1 wherein the edge fastener and the end fastener are snap fasteners and the matching edge fastener and matching end fastener are matching snap fasteners.

\* \* \* \* \*